(12) United States Patent
Shinagawa et al.

(10) Patent No.: US 8,240,449 B2
(45) Date of Patent: *Aug. 14, 2012

(54) LOCKING DEVICE OF ROTARY SHAFT

(75) Inventors: Yu Shinagawa, Shiojiri (JP); Atsuhiko Takeuchi, Matsumoto (JP); Satoshi Kawamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 12/437,678

(22) Filed: May 8, 2009

(65) Prior Publication Data

US 2009/0277744 A1    Nov. 12, 2009

(30) Foreign Application Priority Data

May 12, 2008   (JP) ................. 2008-124399

(51) Int. Cl.
*F16D 59/02*    (2006.01)

(52) U.S. Cl. .................... 192/223.3; 188/134

(58) Field of Classification Search ............... 192/223, 192/223.3; 188/134
See application file for complete search history.

(56) References Cited

U.S. PATENT DOCUMENTS

| | | | | |
|---|---|---|---|---|
| 632,232 | A * | 9/1899 | Brown | 192/223.3 |
| 922,138 | A * | 5/1909 | Hendler | 192/223.3 |
| 2,887,201 | A * | 5/1959 | Willis | 192/69.81 |
| 3,194,366 | A * | 7/1965 | Hensel | 192/223.2 |
| 3,692,161 | A * | 9/1972 | Katsuren et al. | 192/223.3 |
| 5,934,810 | A | 8/1999 | Choi et al. | |
| 2007/0085258 | A1 | 4/2007 | Iwago et al. | |
| 2009/0279933 | A1* | 11/2009 | Kawamura et al. | 400/579 |

FOREIGN PATENT DOCUMENTS

| | | |
|---|---|---|
| JP | 10-331941 A | 12/1998 |
| JP | 2007-084224 A | 4/2007 |

* cited by examiner

*Primary Examiner* — Richard M. Lorence
(74) *Attorney, Agent, or Firm* — Workman Nydegger

(57) ABSTRACT

A locking device of a rotary shaft includes a clutch member rotating integrally with the rotary shaft and provided so as to be displaceable in the direction of axis of the rotary shaft, a locking member provided in a fixed state to engage the clutch member to regulate the rotation of the clutch member, a biasing member biasing the clutch member toward the locking member, and a torque transmission member rotating under the rotary torque transmitted thereto from a power source, having a boss loosely inserted into a cam groove provided in an outer peripheral portion of the clutch member, and transmitting the rotary torque to the clutch member via the boss. The boss is displaced within the cam groove with switching of the rotation/stop of the torque transmission member or switching of the rotational direction thereof.

2 Claims, 15 Drawing Sheets

LOCKING DEVICE OF ROTARY SHAFT

BACKGROUND

1. Technical Field

The present invention relates to a locking device that switches locking/unlocking of a rotary shaft.

2. Related Art

In recording apparatuses represented by facsimiles, printers, etc., as a control method for eliminating the skew of a sheet, there is a biting and ejecting type skew removal control as shown in JP-A-2007-84224.

This skew removal control utilizes a downstream roller and an upstream roller, and makes the leading edge of a sheet bitten into the downstream roller and fed toward the downstream by a predetermined amount, and thereafter, reverses the downstream roller in a state where the upstream driving roller has been stopped, and ejects the leading edge of the sheet toward the upstream of the downstream roller. Thereby, the sheet is bent between the upstream roller and the downstream roller, but the leading edge of the sheet follows the downstream roller by virtue of its return behavior, and consequently, skew is corrected.

However, in a case where the above skew removal control is performed on a sheet of high rigidity (high stiffness), such as thick paper, the force to rotate the upstream roller becomes large when the leading edge of the sheet is ejected from the downstream roller. As a result, there is a possibility that the upstream roller may be reversed depending on the case, and thereby, skew may not be eliminated well.

In order to solve such a problem, it is necessary to interpose a clutch that permits only one-way rotation as shown in, for example JP-A-10-331941 between the upstream roller and a motor that drives this roller so that the upstream roller is not reversely rotated and to lock the upstream roller so as not to rotate in a reverse rotation direction.

However, like a recording apparatus that performs records on both sides of a sheet, a roller may be intended to be reversely driven in order to return the sheet to the upstream. Accordingly, in such a case, the clutch that permits only one-way rotation as described above cannot be applied as it is. Accordingly, development of a locking device that can satisfy both rotation driving in normal/reverse directions and reliable prevention (rotational lock) of reverse rotation if necessary has been desired.

Moreover, in a case where a common driving motor is utilized in the upstream roller and the downstream roller, in order to perform the biting and ejecting type skew removal control, the upstream roller should be locked so as not to rotate reversely while the downstream roller is reversely rotated by a predetermined amount, and a locking device that can satisfy such operating conditions is also desired.

SUMMARY

An advantage of some aspects of the invention is that it provides a locking device capable of locking a rotary shaft if necessary while allowing rotation driving of the rotary shaft in both normal/reverse directions and capable of interposing the locked state of the rotary shaft for a predetermined period when the rotational direction of a driving motor is switched.

According to a first aspect of the invention, a locking device of a rotary shaft includes a clutch member rotating integrally with the rotary shaft and provided so as to be displaceable in the direction of axis of the rotary shaft, a locking member provided in a fixed state to engage the clutch member to regulate the rotation of the clutch member, a biasing member biasing the clutch member toward the locking member, and a torque transmission member rotating under the rotary torque transmitted thereto from a power source, having a boss loosely inserted into a cam groove provided in an outer peripheral portion of the clutch member, and transmitting the rotary torque to the clutch member via the boss. The boss is displaced within the cam groove with switching of the rotation/stop of the torque transmission member or switching of the rotational direction thereof, whereby an unlocked state where the boss separates the clutch member from the locking member against the biasing force of the biasing member, and a locked state where the boss permits displacement of the clutch member to engage the locking member with the clutch member.

According to this aspect, the boss is displaced within the cam groove with switching of the rotation/stop of the torque transmission member or switching of the rotational direction thereof, whereby an unlocked state where the rotation of the clutch member (that is, rotary shaft) is permitted and a locked state where the clutch member (rotary shaft) is locked are switched. Thus, the rotary shaft can be locked if necessary while allowing rotation driving of the clutch member (rotary shaft) in both normal/reverse directions. Additionally, the duration of the locked state can be easily adjusted by adjusting the shape of the cam groove.

According to a second aspect of the invention, the cam groove has regulation regions for restraining the clutch member in a position separated from the locking member, on both sides of a deregulation region for permitting displacement of the clutch member, and switching is made in order of the unlocked state, the locked state, and the unlocked state with switching of the rotational direction of the torque transmission member.

According to this aspect, switching is made in order of the unlocked state, the locked state, and the unlocked state of the clutch member (rotary shaft) with switching of the rotational direction of the torque transmission member. Thus, it is possible to interpose the locked state of the rotary shaft for a predetermined period when the rotational direction of a driving motor is switched, and it is possible to cope with such a request.

According to a third aspect of the invention, an engaging portion between the locking member and the clutch member is constituted by meshing teeth. According to this aspect, since an engaging portion between the locking member and the clutch member is constituted by meshing teeth, the clutch member (rotary shaft) can be reliably locked so as not to rotate in a locked state.

The locking device of a rotary shaft according to a fourth aspect of the invention is the locking device of a rotary shaft according to the third aspect in which the tooth profile of the meshing teeth is set such that a pressure angle $\delta 1$ with respect to one rotational direction of the clutch member is $0°<\delta 1<90°$, and a pressure angle $\delta 2$ with respect to the other rotational direction is $0°$.

According to this embodiment, the tooth profile of the meshing teeth that constitutes the engaging portion between the locking member and the clutch member is set such that a pressure angle $\delta 1$ with respect to one rotational direction of the clutch member (rotary shaft) is $0°<\delta 1<90°$. Thus, if the rotary torque exceeds a predetermined value when the rotary shaft is intended to be forcedly rotated by an external force in the one rotational direction, the clutch member (rotary shaft) can be rotated, breakage of the device when the rotary shaft is intended to be forcedly rotated by an external force can be prevented. Additionally, when an external force is applied to the rotary shaft to rotate the rotary shaft as a means in an emergency, it is possible to cope with such a request. Additionally, since a pressure angle δ2 with respect to the other rotational direction is 0°, the rotation of the clutch member (rotary shaft) can be reliably locked.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Figure 1:
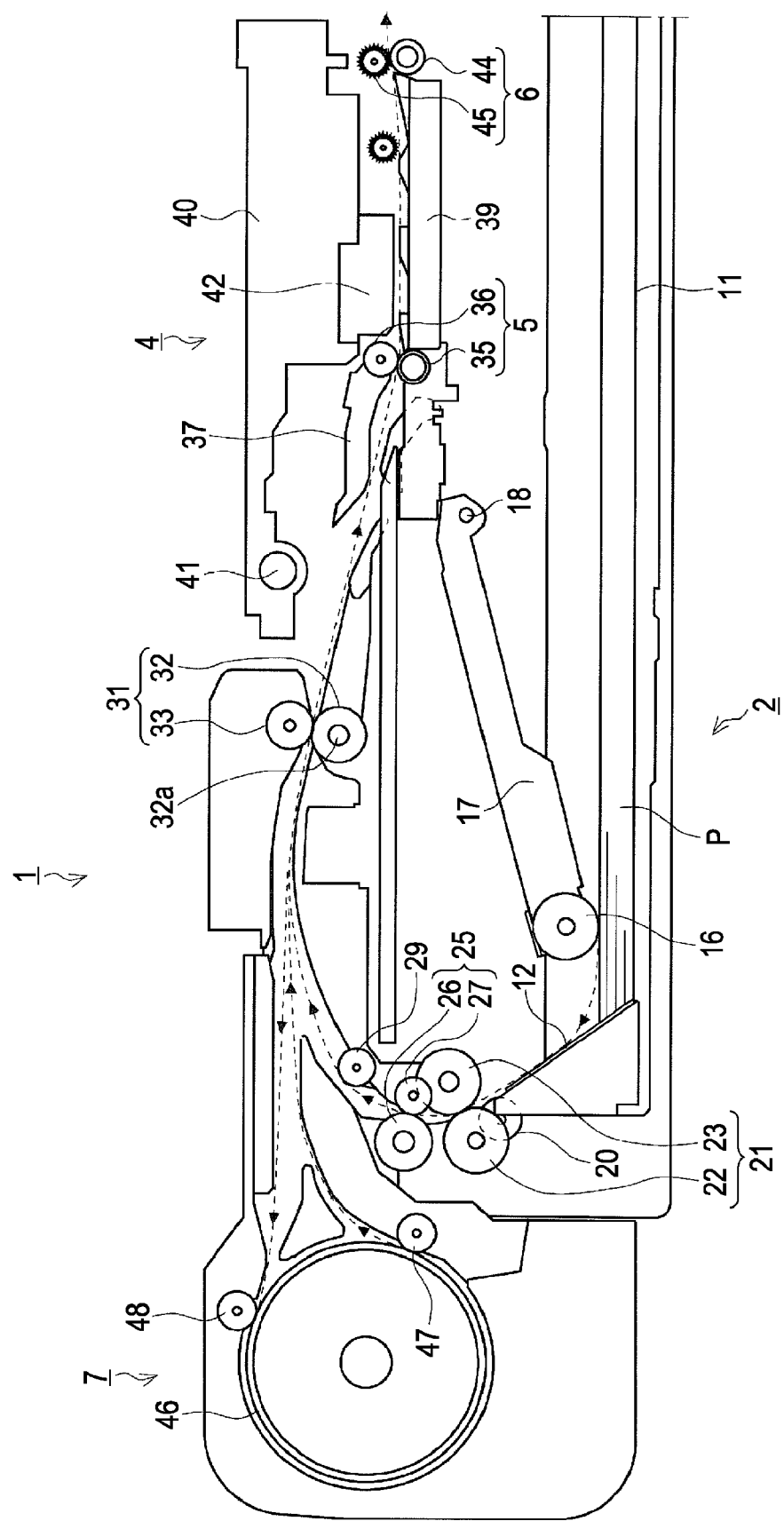
FIG. 1 is a sectional side view showing a sheet transporting path of a printer according to the invention.
Figure 2:
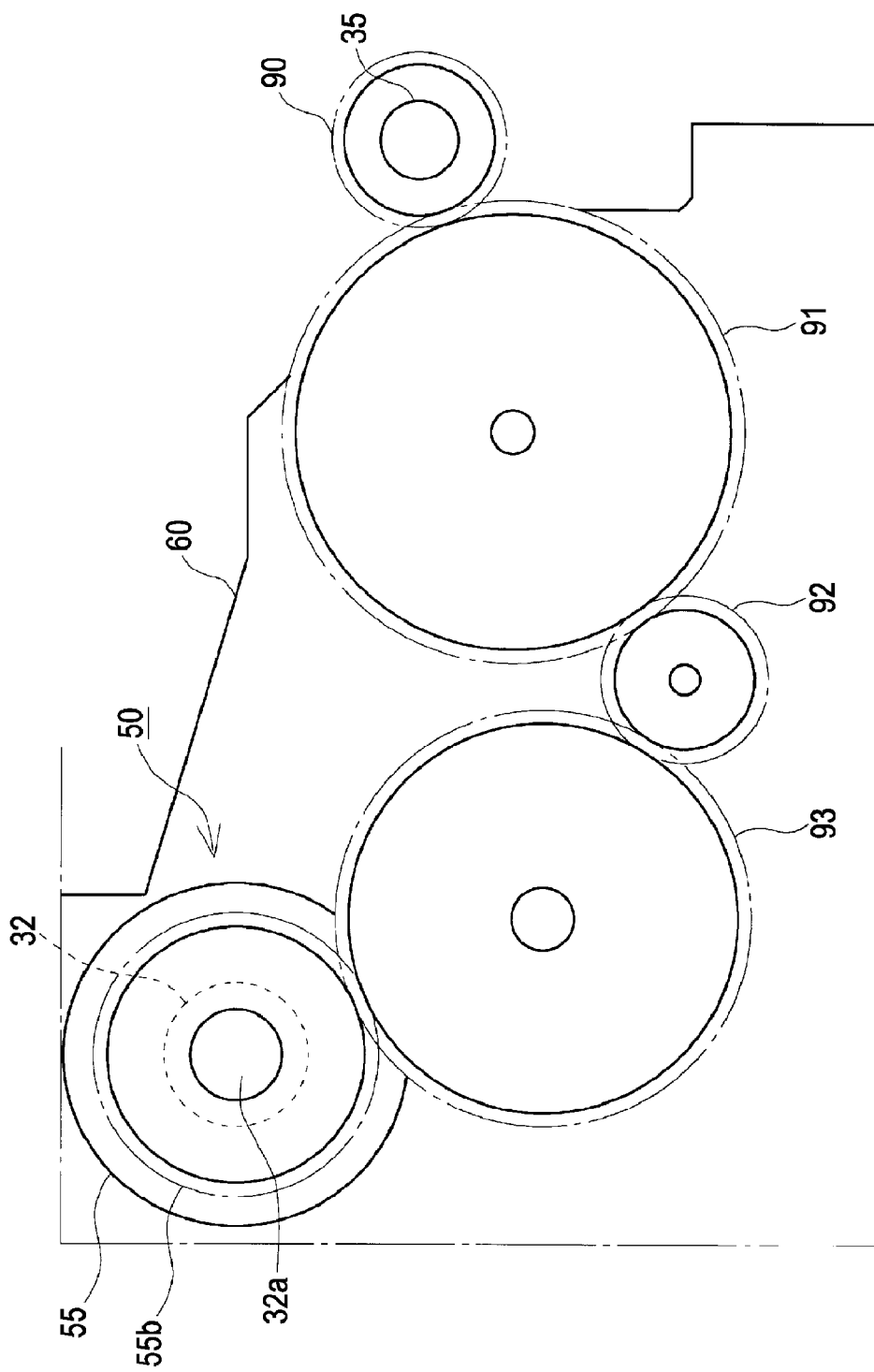
FIG. 2 is a front view of a locking device according to a first embodiment of the invention.
Figure 3:
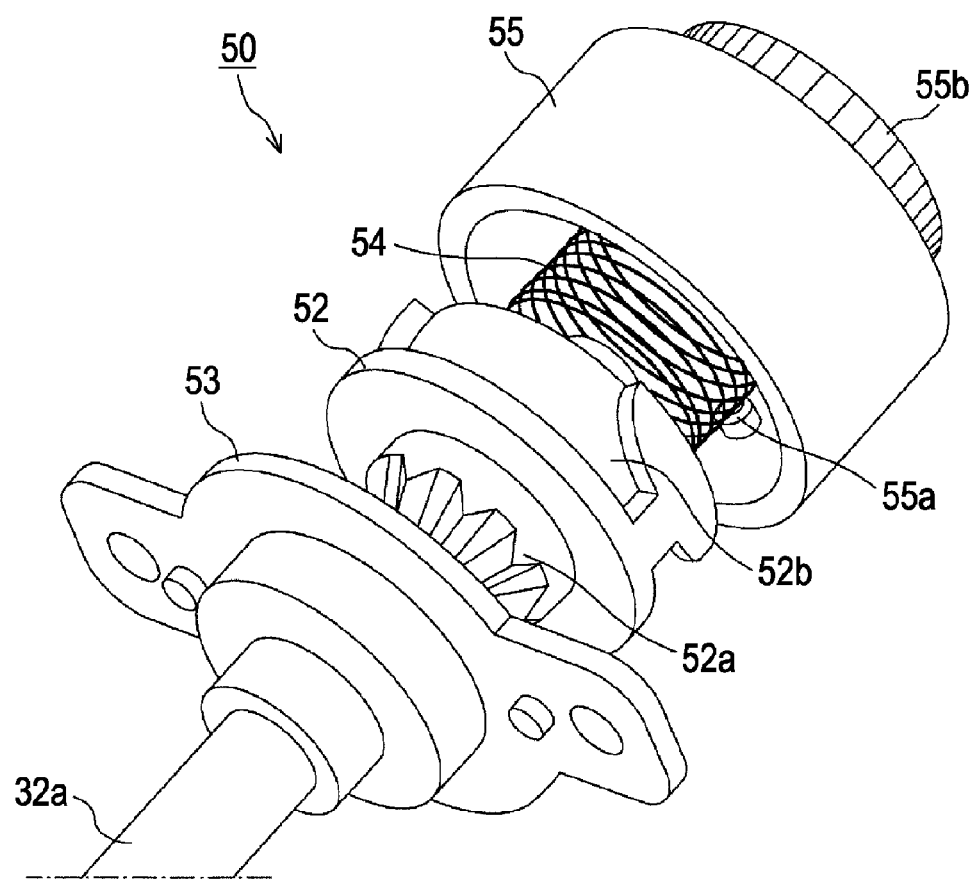
FIG. 3 is an exploded perspective view of the locking device according to a first embodiment of the invention.
Figure 4:
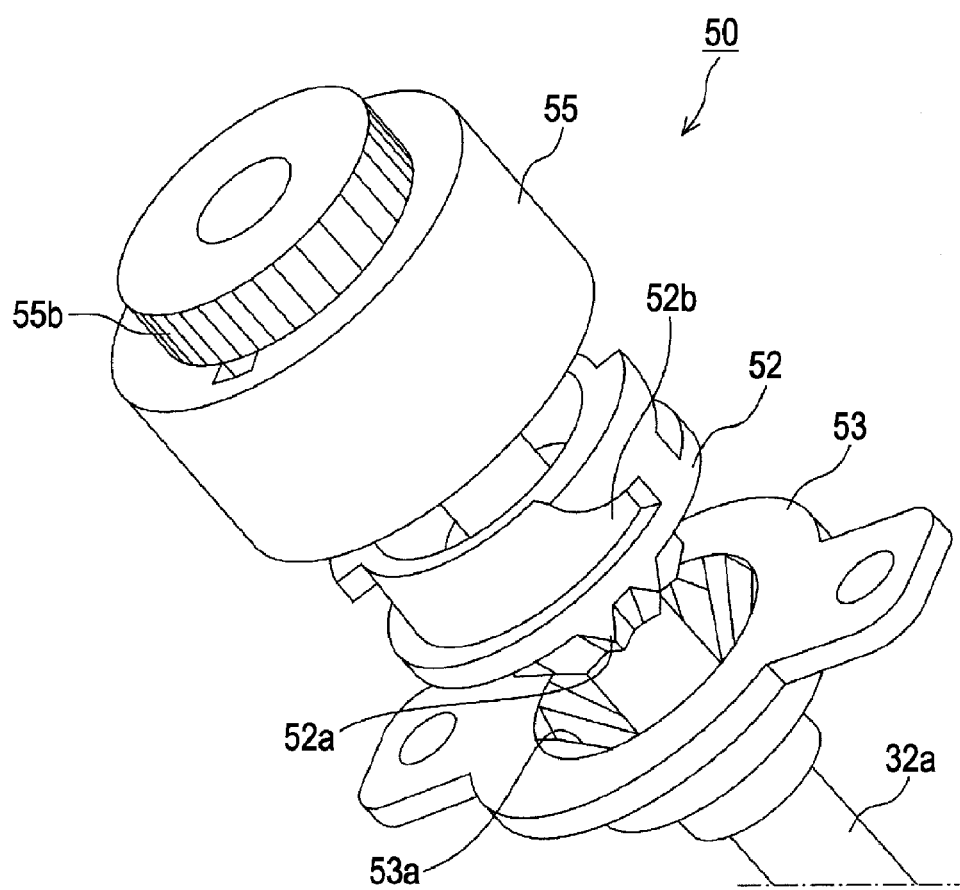
FIG. 4 is an exploded perspective view of the locking device according to a first embodiment of the invention.
Figure 5:
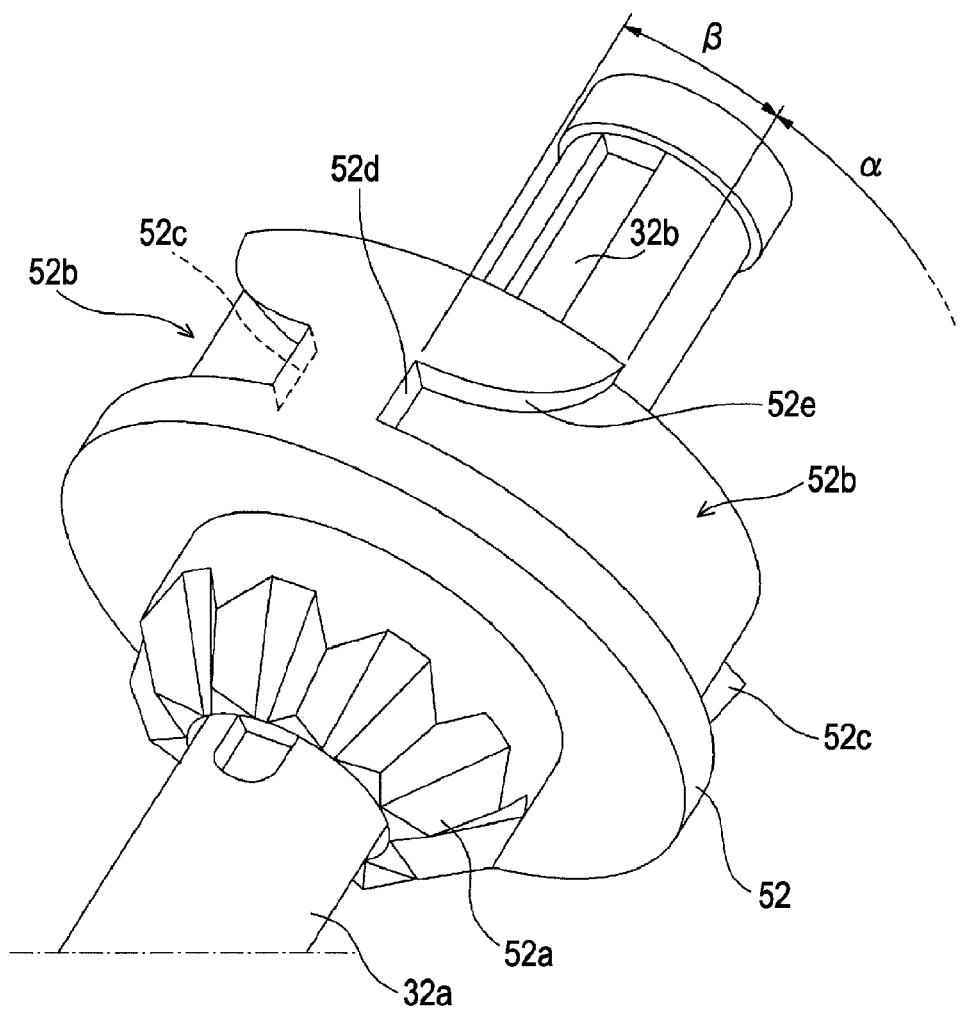
FIG. 5 is a perspective view of a rotary shaft and a clutch member.
Figure 6A:
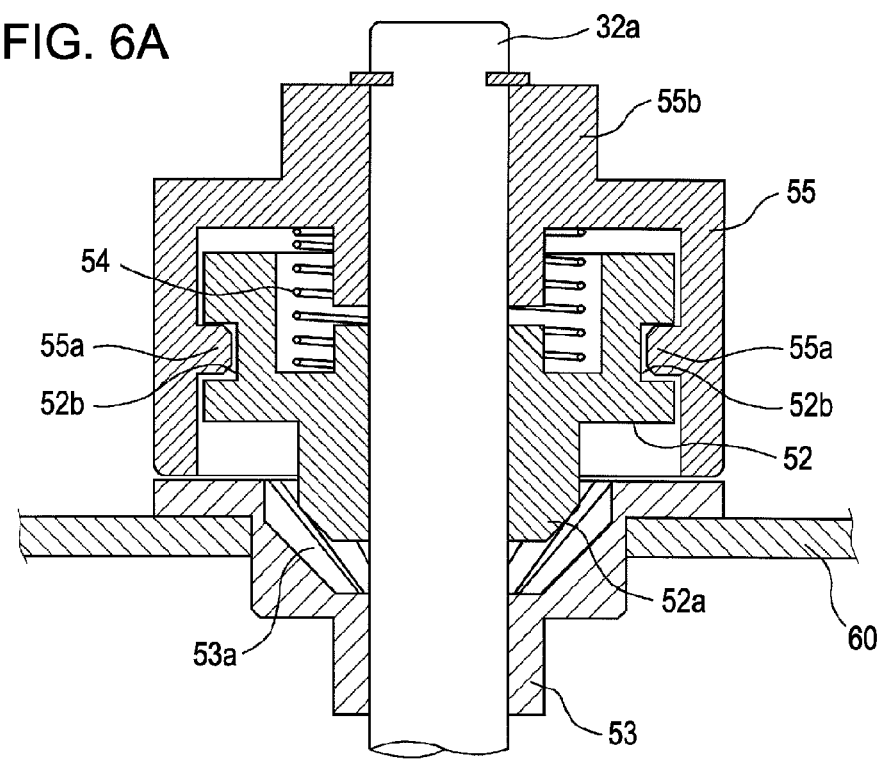
FIG. 6A is a sectional view when the locking device according to the first embodiment of the invention is cut in a plane parallel to the direction of axis of the rotary shaft.
Figure 6B:
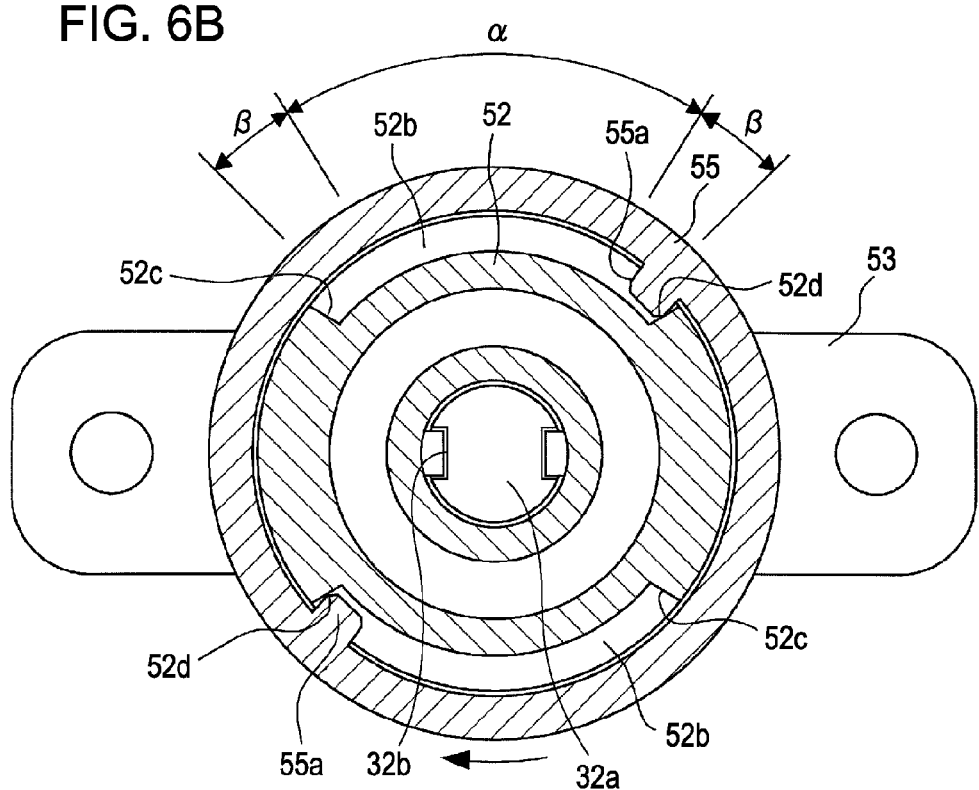
FIG. 6B is a sectional view when the locking device is cut in a plane orthogonal to the direction of axis of the rotary shaft.
Figure 7A:
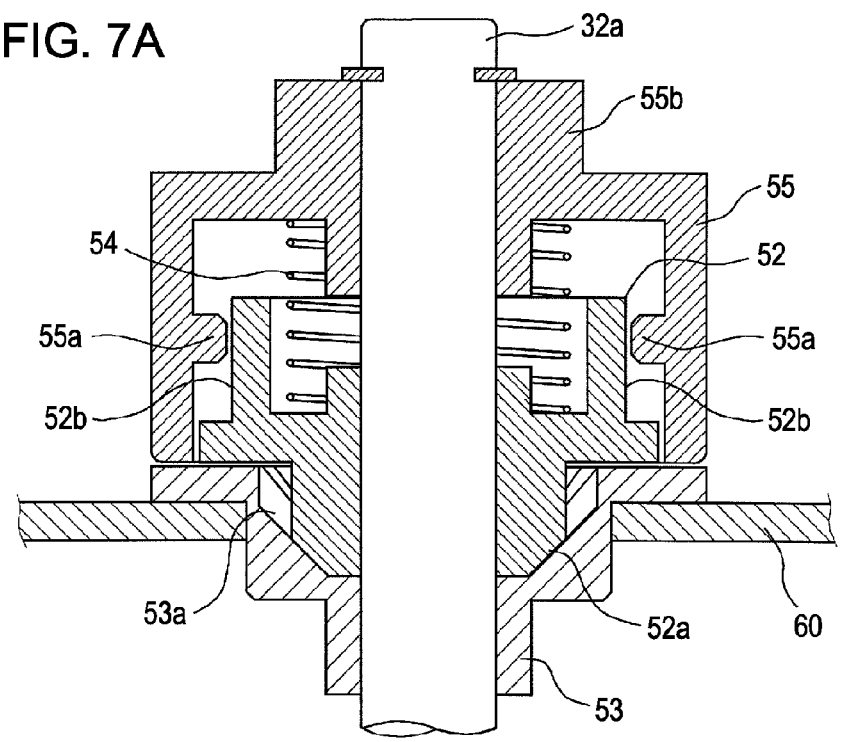
FIG. 7A is a sectional view when the locking device according to the first embodiment of the invention is cut in a plane parallel to the direction of axis of the rotary shaft.
Figure 7B:
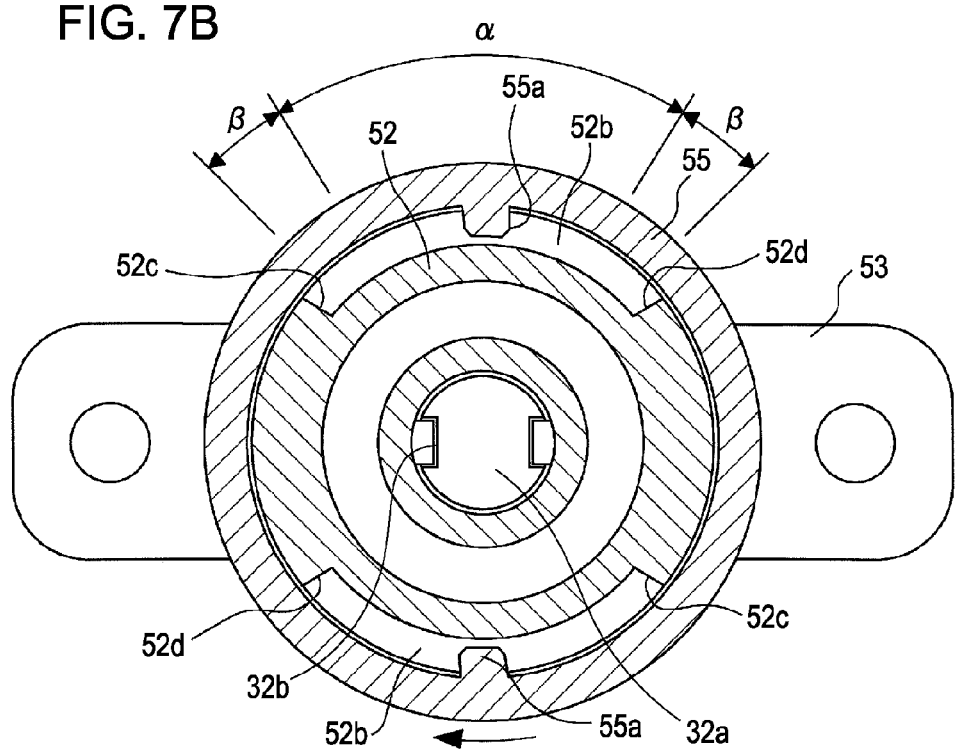
FIG. 7B is a sectional view when the locking device is cut in a plane orthogonal to the direction of axis of the rotary shaft.
Figure 8A:
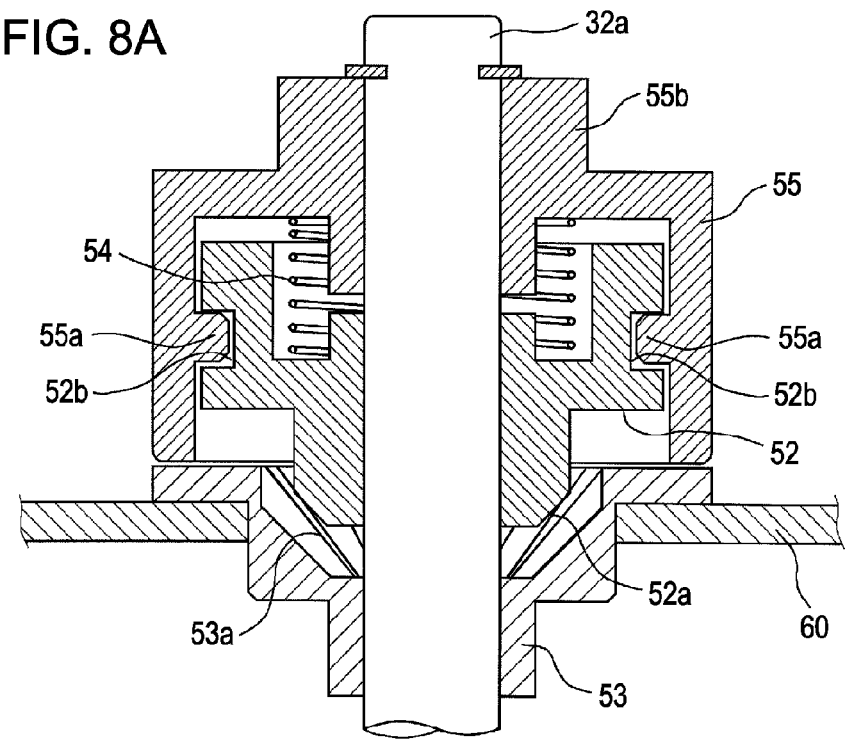
FIG. 8A is a sectional view when the locking device according to the first embodiment of the invention is cut in a plane parallel to the direction of axis of the rotary shaft.
Figure 8B:
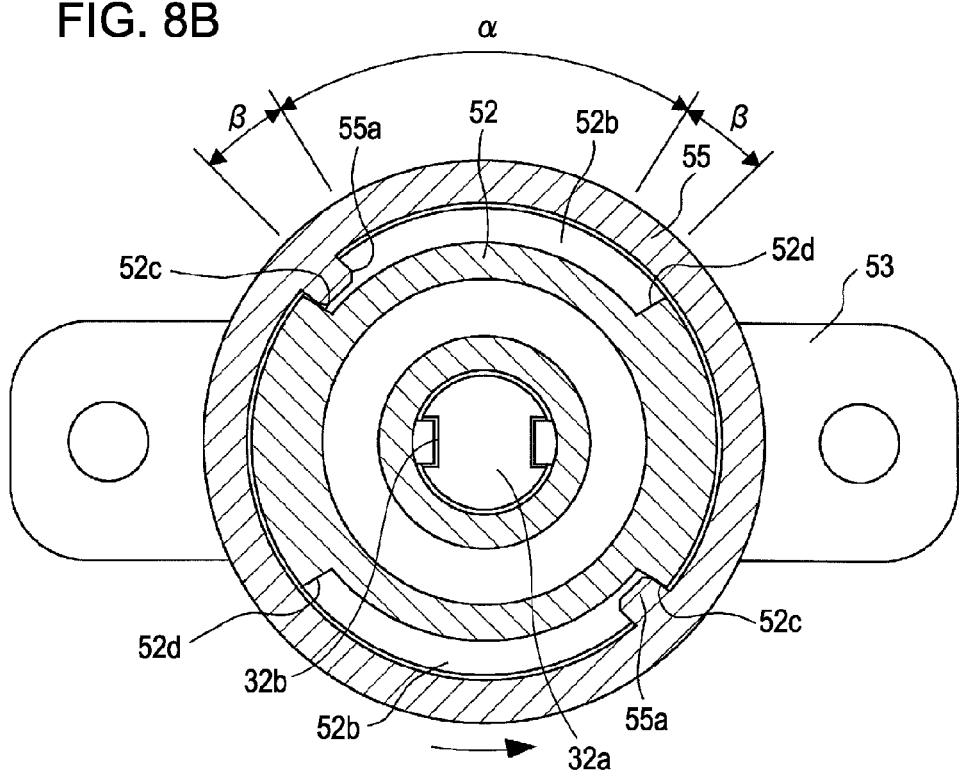
FIG. 8B is a sectional view when the locking device is cut in a plane orthogonal to the direction of axis of the rotary shaft.
Figure 9A:
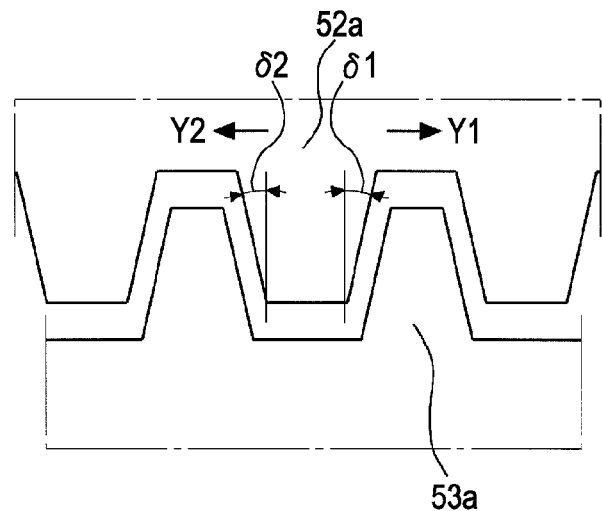
FIGS. 9A to 9C are drawings showing various embodiments of a meshing tooth.
Figure 9B:
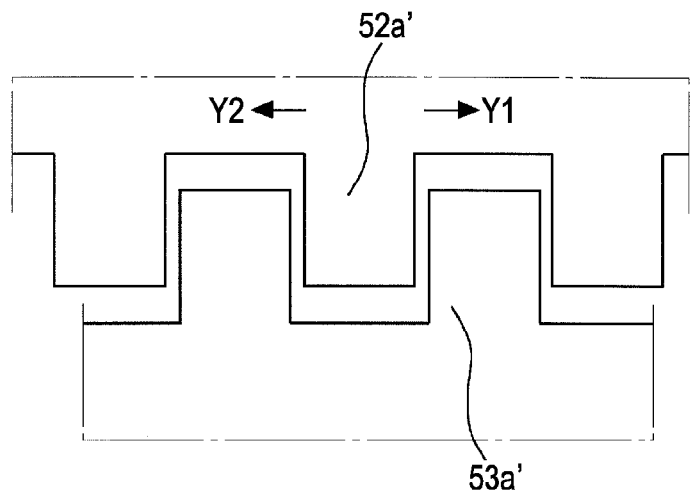

Hereinafter, embodiments of the invention will be described with reference to FIGS. 1 to 15. FIG. 1 is a sectional side view showing a sheet transporting path of an ink jet printer (hereinafter, referred to as "printer") 1 that is one embodiment of a recording apparatus, FIG. 2 is a front view of a locking device 50 according to the first embodiment of the invention, FIGS. 3, and 4 are exploded perspective views of the locking device 50, FIG. 5 is a perspective view of a rotary shaft 32a and a clutch member 52, FIGS. 6A, 7A, and 8A are sectional views when the locking device 50 is cut in a plane parallel to the direction of axis of the rotary shaft 32a, FIGS. 6B, 7B, and 8B are sectional views when the locking device 50 is cut in a plane orthogonal to the direction of axis of the rotary shaft 32a, and FIGS. 9A and 9B are drawings showing various embodiments of meshing teeth.

Figure 10:
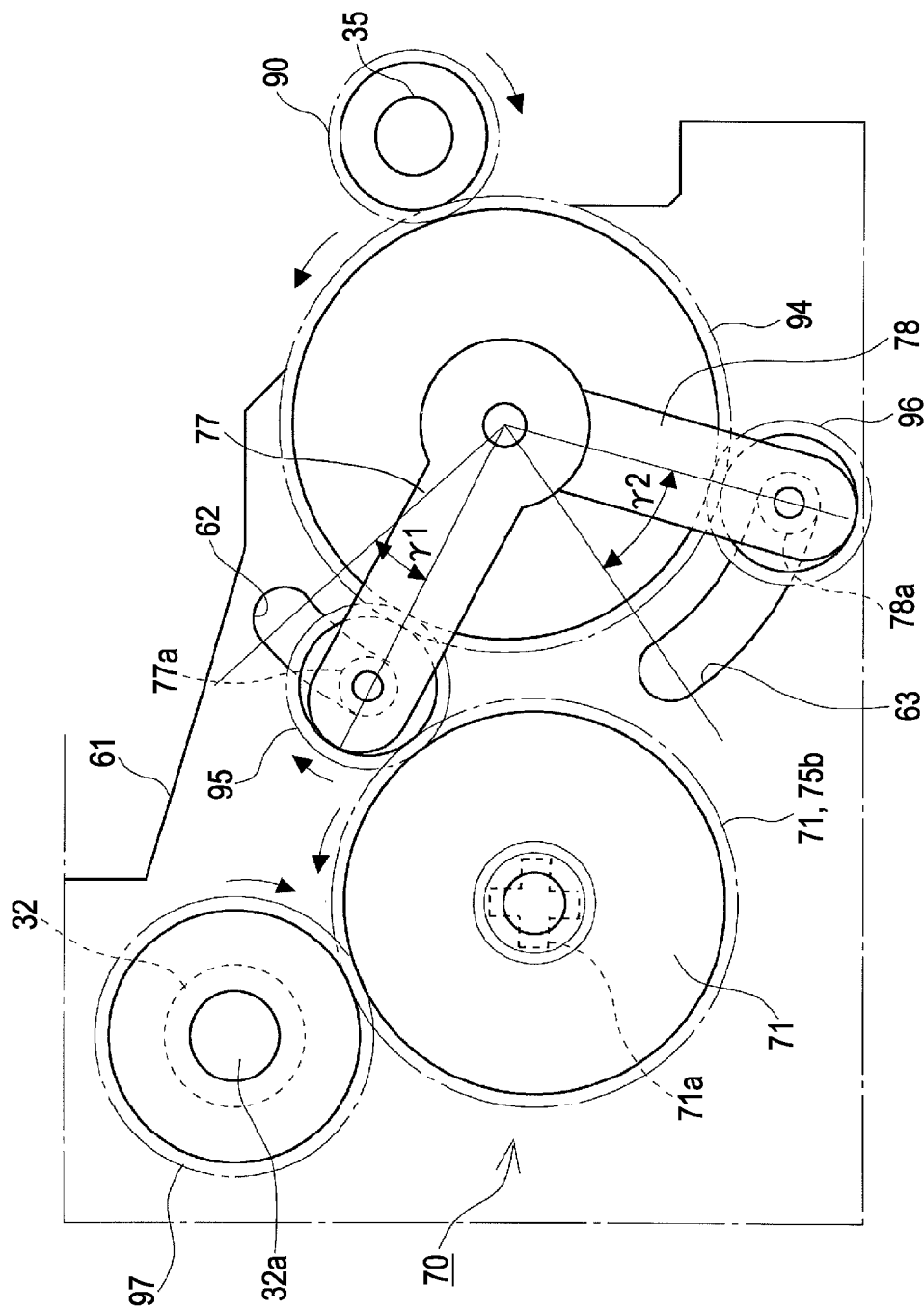
FIG. 10 is a front view of a locking device according to a second embodiment of the invention.
Figure 11:
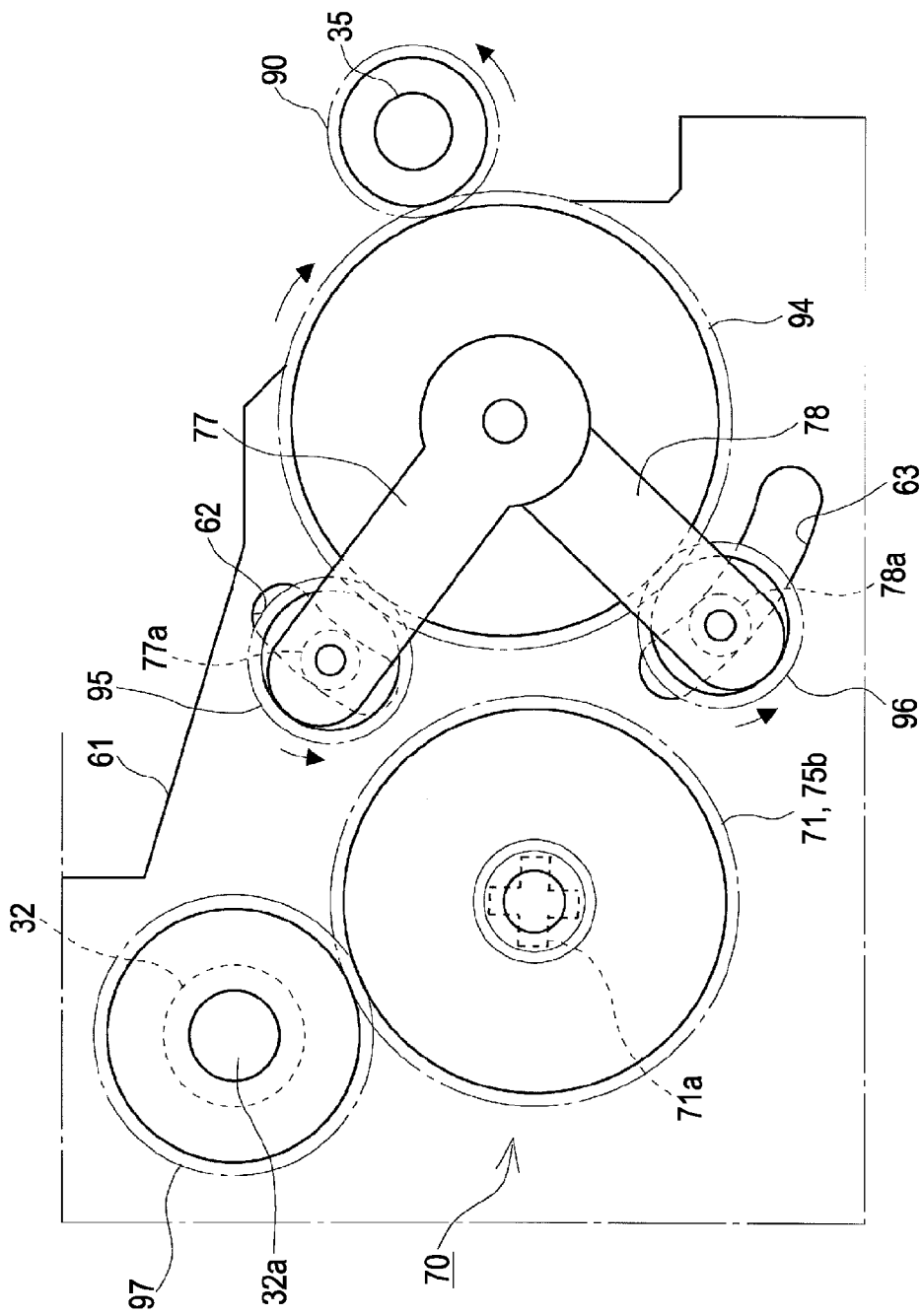
FIG. 11 is a front view of the locking device according to the second embodiment of the invention.
Figure 12:
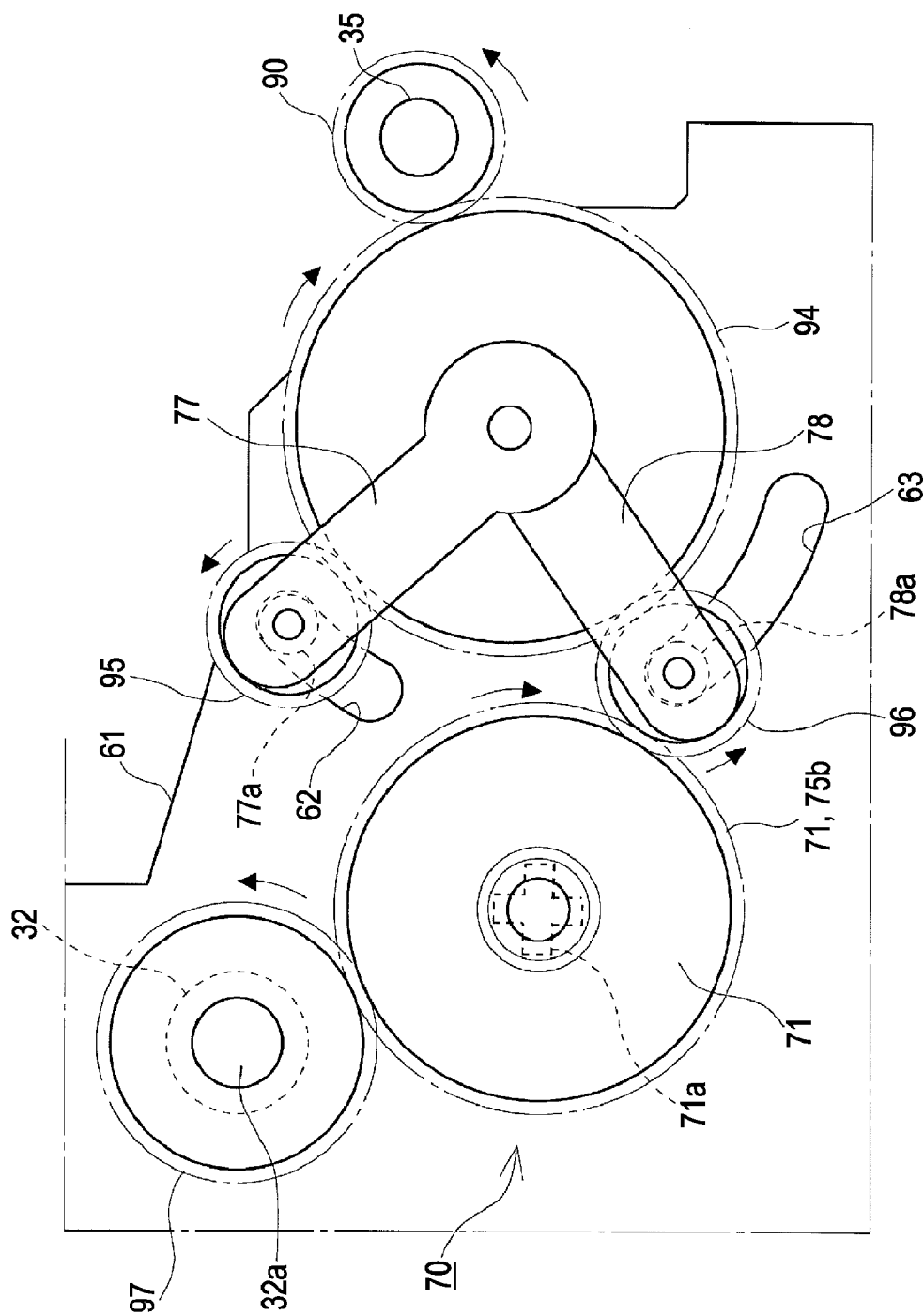
FIG. 12 is a front view of the locking device according to the second embodiment of the invention.
Figure 13:
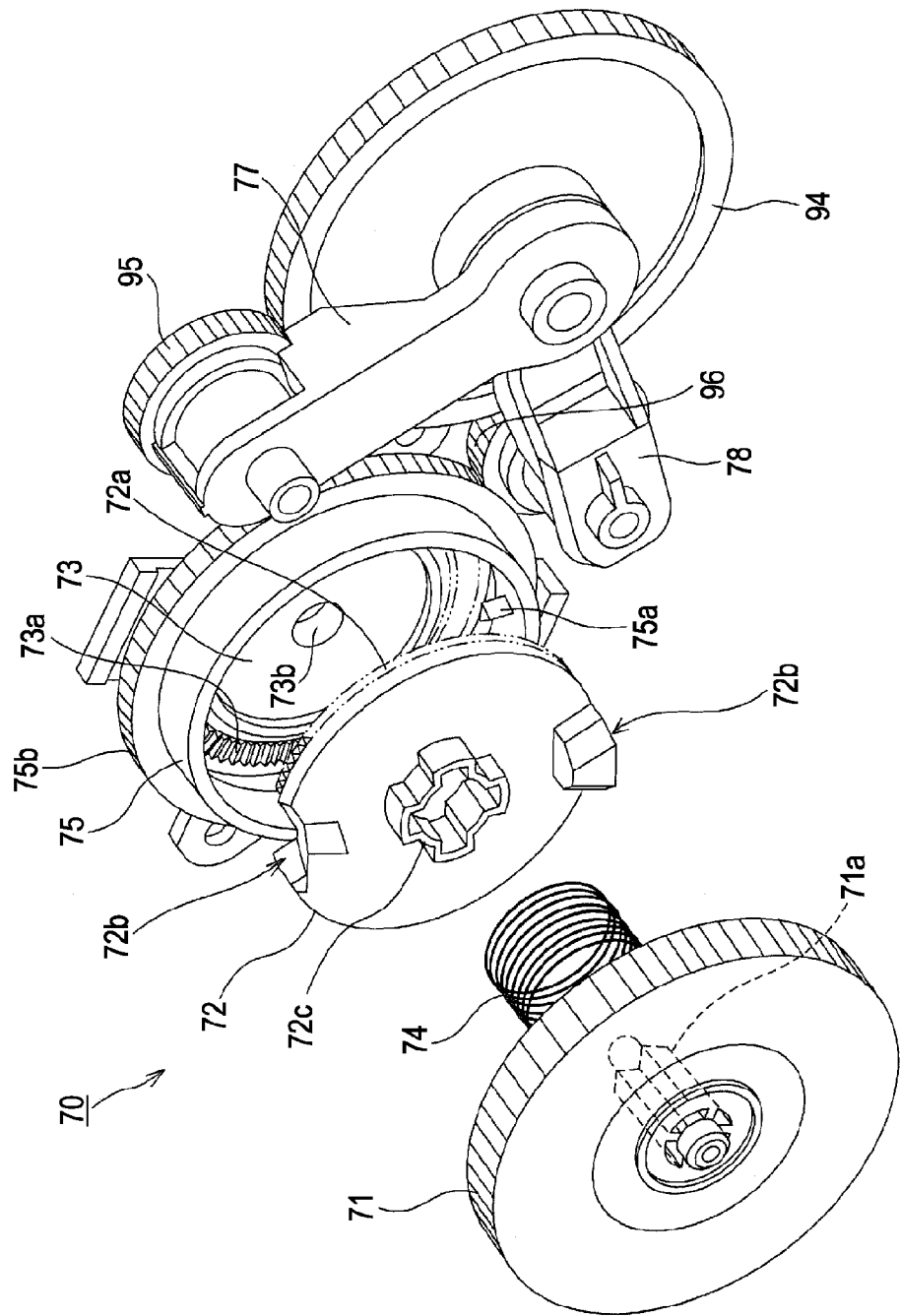
FIG. 13 is an exploded perspective view of the locking device according to the second embodiment of the invention.
Figure 14:
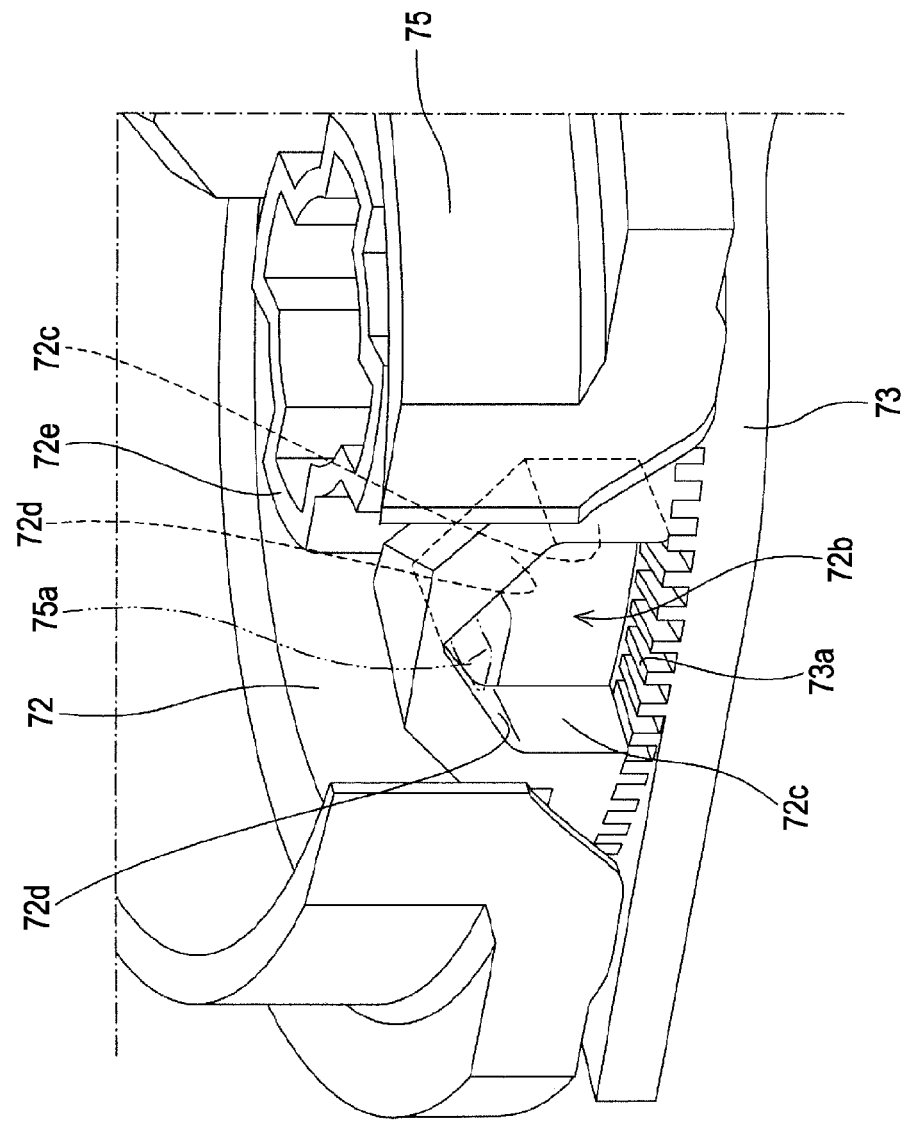
FIG. 14 is an enlarged perspective view (partially sectional view) of the locking device according to the second embodiment of the invention.
Figure 15A:
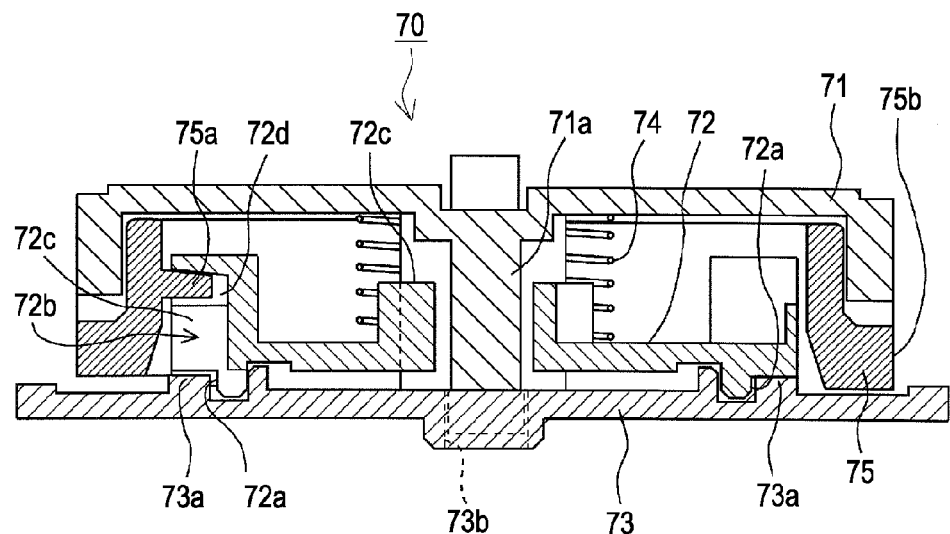
FIGS. 15A and 15B are sectional views when the locking device is cut in a plane parallel to the direction of axis of the rotary shaft.

Additionally, FIGS. 10 to 12 are front views of a locking device 70 according to a second embodiment of the invention, FIG. 13 is an exploded perspective view of the locking device, FIG. 14 is an enlarged perspective view (partially sectional view) of essential portions of the locking device, and FIGS. 15A and B are a sectional view when the locking device 70 is cut in a plane parallel to the direction of axis of a rotary shaft 71a.

1. Configuration of Recording Apparatus

Hereinafter, the entire configuration of the printer 1 will be outlined with reference to FIG. 1. In addition, FIG. 1 shows almost all rollers on the same plane in order to illustrate rollers to be arranged on the sheet transporting path of the printer 1, but the positions of the rollers in their depth direction (in the front and back direction of the sheet of FIG. 1) do not necessarily coincide with each other (may coincide with each other).

The printer 1 has an a sheet feeder 2 at the bottom of the apparatus, and is configured to feed a recording sheet P as a recording medium one by one from the sheet feeder 2, perform ink jet recording in a recording unit 4, and eject the recording sheet toward a sheet ejection stacker (not shown) provided on the front side (on the left side in FIG. 1) of the apparatus. Additionally, the printer 1 has a double-sided unit 7 provided at a rear part of the apparatus, and is adapted to be able to curve and reverse the sheet P such that a second surface opposite to a first surface of the sheet on which recording has first been performed faces a recording head 42, and thereby execute recording on both surfaces of the sheet P.

Hereinafter, respective components will be further described. The sheet feeder 2 includes a sheet cassette 11, a pickup roller 16, a guide roller 20, and a separator 21. The sheet cassette 11 that can accommodate a plurality of sheets P in a stacked state is configured such that it can be mounted to a main body of the sheet feeder 2 or demounted from the front of the sheet feeder, and the pickup roller 16 that is rotated by a motor (not shown) is provided in a rocking member 17 that rocks about a rocking shaft 18, and rotates in contact with a sheet accommodated in the sheet cassette 11, thereby feeding out the uppermost sheet P from the sheet cassette 11.

A separating member 12 is provided in a position that faces the leading edge of a sheet accommodated in the sheet cassette 11, and as the leading edge of the uppermost sheet P to be fed advances toward the downstream while being brought into sliding contact with the separating member 12, a first stage separation from the next and subsequent sheets P is performed. The guide roller 20, which is freely rotatable, is provided on the downstream side of the separating member 12, and the separator 21, which includes a separation roller 22 and a driving roller 23 and performs the second stage separation of the sheet P, is provided on the downstream side of the guide roller.

A first middle feed section 25, including a driving roller 26 is rotationally driven by a motor (not shown), and an assist roller 27 that nips the sheet P between the assist roller and the driving roller 26 to rotationally drive the sheet, is provided on the downstream side of the separator 21, and the sheet P is further fed toward the downstream by the first middle feed section 25. In addition, reference numeral 29 represents a driven roller that alleviates the sheet passage load when the sheet P passes through a curved reversing path (especially when the trailing edge of the sheet passes through the path).

A second middle feed section 31, including a driving roller 32 that is rationally driven by a motor (not shown), and an assist roller 33 that nips the sheet P between the assist roller and the driving roller 32 to rotationally drive the sheet, is provided on the downstream side of the driven droller 29, and the sheet P is further fed toward the downstream by the second middle feed section 31.

The recording unit 4 is arranged on the downstream side of the second middle feed section 31. The recording unit 4 includes a transporting portion 5, the recording head 42, a front sheet guide 39, and an ejector 6. The transporting portion 5 includes a transport driving roller 35 that is rotated by a motor (not shown), and a transport driven roller 36 that is journalled to an upper sheet guide 37 so as to rotate to follow the transport driving roller 35 in pressure contact therewith, and the sheet P is precisely fed toward a position that face the recording head 42 by the transporting portion 5.

In addition, the skew of the recording sheet P fed from the sheet feeder 2 is removed by biting and ejecting type skew removal control utilizing the second middle feed section 31 and the transporting portion 5 on the downstream side of the feed section. Specifically, after the leading edge of the recording sheet P is bitten between the transport driving roller 35 and the transport driven roller 36 and is fed toward the downstream by a predetermined amount, the transport driving roller 35 is reversed in a state where the upstream driving roller 32 has been stopped, and the leading edge of the sheet is ejected toward the upstream of the transport driving roller 35. Thereby, the leading edge of the sheet follows the nip point between the transport driving roller 35 and the transport driven roller 36, thereby correcting skew.

Then, the recording head 42 is provided at the bottom of the carriage 40, and the carriage 40 is driven so as to reciprocate in a main scanning direction by a motor (not shown) while being guided by a carriage guide shaft 41 that extends in the main scanning direction (in the front and back direction of the sheet of FIG. 1). The front sheet guide 39 is provided in the position that faces the recording head 42, and the distance between the sheet P and the recording head 42 is specified by the front sheet guide 39.

The ejector 6 provided on the downstream side of the front sheet guide 39 includes an ejection driving roller 44 that is rotationally driven by a motor (not shown), and an ejection driven roller 45 that rotates to follow the ejection driving roller 44 in contact therewith, and the sheet P on which recording has been performed by the recording unit 4 is ejected to the stacker (not shown) provided on the front side of the apparatus by the ejector 6.

The double-sided unit 7 includes a large-diameter reversing roller 46, and assist rollers 47 and 48 that nip the sheet P between the assist rollers and the reversing roller 46 to rotationally drive the sheet. The sheet P that is delivered from the sheet cassette 11 and on the first surface of which recording has been performed is introduced between the reversing roller 46 and the assist roller 48 in a state where the edge of the sheet that has been the trailing edge of the sheet when recording is executed by the first surface becomes the leading edge of the sheet by back-feed operation by the second middle feed section 31, the transporting portion 5, and the ejector 6.

The reversing roller 46 is rotationally driven in the counterclockwise direction of FIG. 1 by a motor (not shown), and the sheet introduced between the reversing roller 46 and the assist roller 48 reaches again the second middle feed section 31 through between the reversing roller 46 and the assist roller 47, and is guided to the recording unit 4 where recording is executed in the following manner.

In addition, all of the pickup roller 16, the driving rollers 23, 26, and 32, the transport driving roller 35, the ejection driving roller 44, and the reversing roller 46, which are provided in the sheet transporting path described above, are configured so as to be rotationally by a common driving motor. The locking device according to the invention is provided between the driving roller 32 and a driving motor that constitute the second middle feed section 31, thereby locking the rotation of the driving roller 32 if necessary.

2. First Embodiment of Locking Device

Hereinafter, a first embodiment of the invention will be described with reference to FIGS. 2 to 9. In FIG. 2, reference numeral 60 represents a side frame (that constitutes the substrate of the printer 1) that forms a plane parallel to a sheet transport direction, and the locking device 50 is provided in the side frame 60.

In FIG. 2, reference numeral 90 represents a gear provided at a shaft end of the transport driving roller 35, and the rotary torque of a motor is transmitted to the locking device 50 via gears 91, 92, and 93 from the gear 90. In addition, a gear train (not shown) is further provided on the left side from a gear portion 55b of FIG. 2, and the rotary torque of the transport driving roller 35 (driving motor) is transmitted to a reversing device 7 (reversing roller 46) via the locking device 50.

In FIG. 2, reference numeral 32a represents a rotary shaft of the driving roller 32 described above, and the locking device 50 switches an unlocked state where the rotation of the rotary shaft 32a is permitted, and a locked state where the rotary shaft is locked for non-rotation. As shown in FIGS. 3 and 4, the locking device 50 includes the clutch member 52, a locking member 53, a coil spring 54 as a biasing member, and a torque transmission member 55.

The clutch member 52 is formed which a hole that allows the rotary shaft 32a to be inserted therethrough, is configured so as to transmit rotary torque to the rotary shaft 32a via a key groove 32b (FIG. 5) formed in the rotary shaft 32a, that is, is configured so as to rotate integrally with the rotary shaft 32a.

Additionally, the clutch member is provided so as to be slidable in the direction of axis of the rotary shaft 32a, that is, is provided in a non-restrained state in the direction of axis of the rotary shaft 32a while being guided by the key groove 32b.

Cam grooves 52b are formed at the outer peripheral portion of the clutch member 52 so as to extend in a peripheral direction, and meshing teeth 52a are formed in a position that faces the locking member 53 in an assembled state of the locking device 50.

The locking member 53 is formed with a hole that allows the rotary shaft 32a to be inserted therethrough, and meshing teeth 53a are formed in a position that faces the meshing teeth 52a that are formed in the clutch member 52 in the assembled state of the locking device 50. In addition, the locking member 53 is provided in a fixed state in the side frame 60.

The coil spring 54 is interposed between the torque transmission member 55 and the clutch member 52 to bias the clutch member 52 toward the locking member 53.

The torque transmission member 55 makes a cylindrical shape that accommodates the coil spring 54 and the clutch member 52 in the assembled state of the locking device 50, and integrally includes the gear portion 55b. As the gear portion 55b meshes with the gear 93 (FIG. 2), the rotary torque from a driving motor is transmitted, and the rotary shaft 32a is rotated as a rotary shaft.

In addition, as described above, the clutch member 52 is provided so as to rotate integrally with the rotary shaft 32a. However, the torque transmission member 55 is provided so as to be rotatable relative to the rotary shaft 32a by a fixed rotational amount unlike the clutch member 52 (this will be described in detail).

Two bosses 55a are formed in opposed positions on an inner peripheral surface of the torque transmission member 55 such that their arrangement interval makes a phase of 180°, and the bosses 55a are loosely inserted into the cam grooves 52b (two grooves are formed like the bosses 55a) formed in the clutch member 52 in the assembled state of the locking device 50.

As shown in FIG. 5 and FIGS. 6 to 8, each cam groove 52b include a deregulation region α that permits the movement relative to the boss 55a in the direction of axis of the rotary shaft 32a, and regulation regions β that are located on both sides of the deregulation region to regulate the relative movement. Thereby, when the boss 55a is in the deregulation region α, movement of the clutch member 52 in the direction of axis of the rotary shaft 32a is permitted, and when the boss 55a is in the regulation regions β, movement of the clutch member 52 in the direction of axis is regulated.

The operation of the locking device 50 configured as described above will be described with reference to FIGS. 6 to 8. FIG. 6 shows a state where the rotary torque in the clockwise direction of FIG. 6B is transmitted to the torque transmission member 55. In this state, the boss 55a of the torque transmission member 55 is in the regulation regions β of the cam groove 52b, and the boss 55a pushes one end face 52d of the cam groove 52b to transmit rotary torque to the clutch member 52.

At this time, as shown in FIG. 6A, the boss 55a separates the clutch member 52 from the locking member 53 against the biasing force of the coil spring 64. Thus, the meshing teeth 52a of the clutch member 52 and the meshing teeth 53a of the locking member 53 do not mesh with each other. Accordingly, the clutch member 52 is brought into an unlocked state where the rotation thereof has been permitted, and as rotary torque is transmitted in order of the torque transmission member 55, the clutch member 52, and the rotary shaft 32a, the rotary shaft 32a (driving roller 32) rotates.

When the rotational direction of the torque transmission member 55 changes in the counterclockwise direction of FIG. 6B from this state, as shown in FIG. 7B, the boss 55a moves to the deregulation region α of the cam groove 52b, thereby bringing a state where the boss 55a does not transmit rotary torque to the clutch member 52.

At this time, as shown in FIG. 7A, the boss 55a permits displacement of the clutch member 52. Thus, the clutch member 52 is engaged with the locking member 53 by the biasing force of the coil spring 54, that is, the meshing teeth 53a of the locking member 53 mesh with the meshing teeth 52a of the clutch member 52. Accordingly, the clutch member 52 is brought into a locked state where the rotation thereof has been regulated. As a result, even if an external force is applied to the rotary shaft 32a (driving roller 32) so as to rotate the shaft, the rotary shaft 32a (driving roller 32) does not rotate by meshing between the meshing teeth 52a and the meshing teeth 53a.

When the torque transmission member 55 further rotates in the counterclockwise direction of FIG. 7B from this state, as shown in FIG. 8B, the boss 55a moves to the regulation region β of the cam groove 52b, and the boss 55a pushes the other end face 52c of the cam groove 52b so as to transmit rotary torque to the clutch member 52.

At this time, as shown in FIG. 8A, the boss 55a separates the clutch member 52 from the locking member 53 against the biasing force of the coil spring 64. Thus, meshing between the meshing teeth 52a of the clutch member 52 and the meshing teeth 53a of the locking member 53 is released. Accordingly, the clutch member 52 shifts to an unlocked state where the rotation thereof has been permitted, and rotary torque is transmitted in order of the torque transmission member 55, the clutch member 52, and the rotary shaft 32a, whereby the rotary shaft 32a (driving roller 32) rotates.

In addition, when the rotational direction of the torque transmission member 55 is again switched from this state, respective components move in the order reversed to the above order, that is, switching to the locked state shown in FIG. 7 and the unlocked state shown in FIG. 6 from the unlocked state that shown in FIG. 8 is made.

Additionally, when the rotation of the torque transmission member 55 stops from the unlocked state of FIG. 6 or 8, as shown in FIG. 5, a cam surface 52e in the regulation region β of the cam groove 52b is formed by a curved surface so as to guide the boss 55a toward the deregulation region α. Thus, switching to the locked state shown in FIG. 7 is made after the clutch member 52 (rotary shaft 32a) has rotated slightly.

As described above, in the locking device 50, the boss 55a is displaced within the cam groove 52b with switching of the rotational direction of the torque transmission member 55 or switching of the rotation/stop thereof, whereby the unlocked state where the rotation of the clutch member 52 (rotary shaft 32a) is permitted and the locked state where the clutch member 52 (rotary shaft 32a) is locked are switched.

Hereinafter, the operational effects of the locking device 50 configured as described above will be described. That is, when the gear 90 (that is, transport driving roller 35) rotates normally in FIG. 2 (in the clockwise direction in this drawing), rotary torque is transmitted to the torque transmission member 55 of the locking device 50 via gears 91 to 93, thereby normally rotating the rotary shaft 32a (driving roller 32), and the recording sheet P is transported toward the downstream. In addition, the state of the locking device 50 in this case is the unlocked state shown in FIG. 6.

Here, when the transport driving roller 35 is switched to reverse rotation driving from normal rotation driving in order to perform biting and ejecting type skew removal control as described above, the rotational direction of the torque transmission member 55 of the locking device 50 is switched.

At this time, while the transport driving roller 35 rotates reversely by a predetermined amount, the boss 55a is displaced inside the cam groove 52b in the locking device 50 like a change shown in FIGS. 6 to 8. Thus, the rotary torque in the reverse rotation direction is not transmitted to the rotary shaft 32a (that is, driving roller 32). Moreover, while the boss 55a moves in the deregulation region α, the rotary shaft 32a (that is, driving roller 32) is in a locked state.

For this reason, since the driving roller 32 is reliably locked as described above even if a sheet tends to reversely rotate the driving roller 32 when the leading edge of the sheet is ejected toward the upstream of the transport driving roller 35 by the reverse rotation driving of the transport driving roller 35, the sheet is reliably bent between the transport driving roller 35 and the driving roller 32 and skew is reliably eliminated.

That is, both normal rotation driving and reverse rotation driving of the driving roller 32 are allowed, and reverse rotation of the driving roller is reliably prevented (locked) if necessary. That is, the locking device 50 is able to satisfy both of rotation driving in both normal/reverse rotations, and reliable prevention (locking) of reverse rotation if necessary, unlike one-way clutch that permits only one-way rotation of a rotary shaft.

Moreover, when the biting and ejecting type skew removal control is performed by both rollers in a configuration in which a common driving source is utilized in the transport driving roller 35 and the driving roller 32, it is necessary that the upstream driving roller 32 is locked so as not to rotate reversely while the downstream transport driving roller 35 is reversely rotated by a predetermined amount. However, it is also possible to cope with such a request.

Particularly, by adjusting the shape of the cam groove 52b, specifically, by adjusting the length of the deregulation region α, the duration of the locked state when the rotational direction of the torque transmission member 55 is switched can be adjusted, and the period during which the driving roller 32 is locked can be easily adjusted.

In addition, in this embodiment, an engaging portion between the clutch member 52 and the locking member 53 is formed by meshing teeth. As for the tooth profile of each of the engagement teeth 52a and 53a shown in FIGS. 3 to 8, as shown in FIG. 9A, the pressure angle δ1 with respect to the rotational direction Y1 and the pressure angle δ2 with respect to the rotational direction Y2 are set to $0°<δ1<90°$ and $0°<δ2<90°$.

Figure 9C:
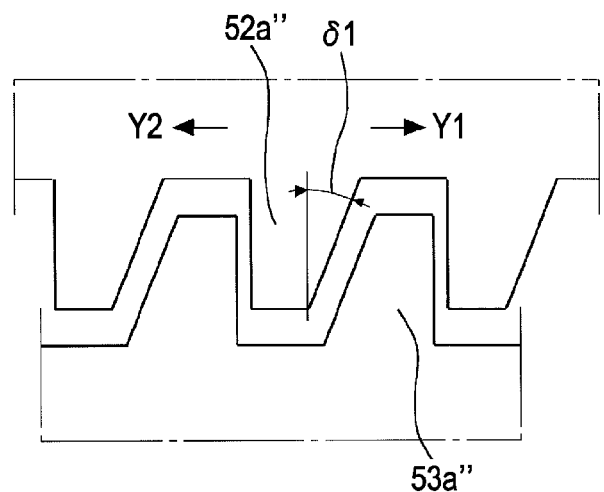

This can also be set to $δ1=δ2=0°$, for example, like meshing teeth 52a' and 53a' as shown in FIG. 9B. By forming the meshing teeth in this way, the clutch member 52 can be more reliably locked as shown in FIG. 9C.

Additionally, like meshing teeth 52a" and 53a", the pressure angle δ1 with respect to one rotational direction Y1 can be set to $0°<δ1<90°$ and the pressure angle δ2 with respect to the other rotational direction Y2 can be set to $δ2=0°$. If this configuration is adopted, the clutch member 52 can be more reliably locked in one rotational direction Y1. Additionally, if the rotary torque of a predetermined value or more is given when the clutch member 52 is forcedly rotated by an external force in the other rotational direction Y2, a tooth face is slippery, and the clutch member 52 can be rotated.

Accordingly, for example, when the biting and ejecting type skew removal control is performed if the rotational direction Y2 is set in the reverse rotation direction in a case where the clutch member is applied to the driving roller 32, reverse rotation of the driving roller 32 can be reliably prevented. Additionally, the driving roller 32 rotates if the rotary torque of a predetermined value or more is given in the normal rotation direction (rotational direction Y1). Thus, when paper jamming or the like occurs, it is possible to cope with such a request in a case where the sheet is pulled out.

3. Second Embodiment of Locking Device

Hereinafter, a locking device 70 according to a second embodiment of the invention will be described with reference to FIGS. 10 to 15. As shown in FIG. 10, the locking device 70 according to this embodiment is independently arranged from the rotary shaft 32a of the driving roller 32, unlike the aforementioned first embodiment. Additionally, the rotary torque from the gear 90 is transmitted to the locking device via a planetary gear mechanism.

Reference numeral 75b in the drawing represents a gear corresponding to the gear portion 55b of the aforementioned first embodiment. When a gear 75b receives rotary torque from a first planetary gear 95 or a second planetary gear 96, similarly to the aforementioned locking device 50, the locking device 70 transmits rotary torque to the rotary shaft 71a (gear 71) accordingly, thereby rotating the rotary shaft 71a (gear 71). Then, when transmission of the rotary torque from the first planetary gear 95 or the second planetary gear 96 is cut off, the rotary shaft 71a (gear 71) is locked accordingly.

Hereinafter, the locking device will be described in more detail. As shown in FIGS. 10 and 13, the side frame 61 is provided with a sun gear 94, the first planetary gear 95, a first planetary lever 77, the second planetary gear 96, a second planetary lever 78, and the locking device 70.

Additionally, the locking device 70 includes the gear 71, a clutch member 72, a locking member 73, a coil spring 74 serving as a biasing member, and a torque transmission member 75. In addition, the clutch member 72, the locking member 73, the coil spring 74, and the torque transmission member 75 correspond to the clutch member 52, the locking member 53, the coil spring 54, and the torque transmission member 55 in the first embodiment, and the respective functions thereof are almost the same.

The first planetary gear 95 and the second planetary gear 96 are rotatably journalled to the first rockable planetary lever 77 and the second rockable planetary lever 78, respectively, which are rockable about the rotation center of the sun gear 94, and mesh with the sun gear 94. Then, as the first planetary lever 77 and the second planetary lever 78 perform rocking operation with the rotation of the sun gear 94, the first and second planetary gears are provided so as to make a sun-and-planet motion around the sun gear 94.

By this sun-and-planet motion, the first and second planetary gears can be displaced between a meshing position where each gear meshes with the gear 75b and a separated position where each gear is separated from the gear 75b. FIG. 10 shows a state where the first planetary gear 95 is in the meshing position and the second planetary gear 96 is in the separated position, and contrary to this, FIG. 12 shows a state where the first planetary gear 95 is in the separated position, and the second planetary gear 96 is in the meshing position. As such, when any one of the first planetary gear 95 and the second planetary gear 96 is in the meshing position, the other planetary gear is in the separated position.

In addition, in this embodiment, for the purpose of convenience, the rotation when the transport driving roller 35 (gear 90) rotates in the clockwise direction of FIG. 10 (when the sheet P is transported toward the downstream) is defined as normal rotation, and the rotation when the transport driving roller rotates in the counterclockwise direction of FIG. 10 is defined as reverse rotation (when the sheet P is transported toward the upstream).

Also, the first planetary gear 95 is displaced to the meshing position, as shown in FIG. 10, with the normal rotation (first direction rotation of the sun gear 94) of the transport driving roller 35, and rotationally drives the transmission gear 75b in the counterclockwise direction of FIG. 10. Additionally, the first planetary gear is displaced to the separated position, as shown in FIG. 12, with the reverse rotation (second direction rotation of the sun gear 94) of the transport driving roller 35.

On the contrary, the second planetary gear 96 is displaced to the meshing position, as shown in FIG. 12, with the reverse rotation (second direction rotation of the sun gear 94) of the transport driving roller 35, thereby rotationally driving the transmission gear 75b in the clockwise direction of FIG. 12. Additionally, the second planetary gear is displaced to the separated position, as shown in FIG. 10, with the normal rotation (first direction rotation of the sun gear 94) of the transport driving roller 35.

In addition, since the gear 71 and the gear 75b have the same external diameter and rotate about the same rotation center, they are shown in an overlapping manner in FIGS. 10 to 12. However, in practice, as shown in FIG. 13, the gear 71 is located on the near side of FIG. 10, and the gear 75b is located on the deep side of FIG. 10. That is, in FIG. 10, the gear 71 meshes only with a gear 97, and does not mesh with the first planetary gear 95 and the second planetary gear 96 that will be described later. Additionally, the gear 75b meshes only with the first planetary gear 95 or the second planetary gear 96, and does not mesh with the gear 97.

Next, in the locking device 70, as shown in FIGS. 10 and 13, the clutch member 72 includes a hole 72e that allows the rotary shaft 71a formed integrally with the gear 71 to be inserted therethrough. The rotary shaft 71a has a cross shape in sectional view, and the hole 72e that allows the rotary shaft to be inserted therethrough is formed so as to have the cross shape similarly to the rotary shaft 71*a* so as to extend along this sectional shape. Accordingly, when the clutch member 72 rotates, the gear 71 is adapted so as to receive rotary torque from the clutch member 72 and rotate integrally with the clutch member 72.

In addition, the rotary shaft 71*a* and the hole 72*e* are in mutually non-restrained relationship in the direction of axis of the rotary shaft 71*a*, that is, the clutch member 72 is provided so that it can be displaced in the direction of axis of the rotary shaft 71*a*.

Cam grooves 72*b* are formed at the outer peripheral portion of the clutch member 72, and meshing teeth 72*a* are formed in a position that faces the locking member 73 in an assembled state of the locking device 70 (also refer to FIG. 14).

Although the rotary shaft 71*a* has a cross-shaped section to the middle thereof extending to the tip thereof, the tip is formed in a cylindrical shape, and the locking member 73 is formed with a hole 73*b* that rotatably receives the tip of the rotary shaft 71*a*. Also, meshing teeth 73*a* are formed in a position that faces with the meshing teeth 72*a* in which the clutch member 72 is formed in the assembled state of the locking device 70. In addition, the locking member 73 is provided in a fixed state in the side frame 61.

The coil spring 74 is interposed between the gear 71 and the clutch member 72 to bias the clutch member 72 toward the locking member 73.

The torque transmission member 75 forms an annular shape that accommodates the clutch member 72 in the assembled state of the locking device 70, integrally includes the gear 75*b* at an outer peripheral portion thereof. As the gear 75*b* meshes with the first planetary gear 95 or the second planetary gear 96, the rotary torque from a driving motor is transmitted to the torque transmission member, and the torque transmission member rotates.

In addition, as described above, the clutch member 72 is provided so as to rotate integrally with the rotary shaft 71*a* (gear 71). However, the torque transmission member 75 is provided so as to be rotatable relative to the clutch member 72 and the rotary shaft 71*a* (gear 71) by a fixed rotational angle (this will be described in detail).

Two bosses 75*a* are formed in opposed positions on an inner peripheral surface of the torque transmission member 75 such that their arrangement interval makes a phase of 180°, and the bosses 75*a* are loosely inserted into the cam grooves 72*b* (two grooves are formed like the bosses 75*a*) formed in the clutch member 72 as shown by an imaginary line in FIG. 14 in the assembled state of the locking device 70.

Each cam groove 72*b* has a shape that permits a fixed amount of movement (a fixed amount of rotation of the torque transmission member 75) of the boss 75*a* in the peripheral direction within the cam groove, and that permits movement of the boss 75*a* in the direction of axis (the vertical direction of FIG. 14) of the rotary shaft 71*a*. More specifically, each cam groove has side walls 72*c* and 72*c* that form faces almost vertical to the direction of axis of the rotary shaft 71*a*, and slopes 72*d* and 72*d* that are inclined with respect to thereto.

The operation of the locking device 70 configured as described above will be described with reference to FIG. 15. FIG. 15A shows a state (for example, a state where both the first planetary gear 95 and the second planetary gear 96 do not mesh with the gear 75*b*) where rotary torque is not transmitted to the torque transmission member 75 (gear 75*b*) from the first planetary gear 95 or the second planetary gear 96.

In this state, the clutch member 72 is engaged with the locking member 73 by the biasing force of the coil spring 74, that is, the meshing teeth 73*a* of the locking member 73 mesh with the meshing teeth 72*a* of the clutch member 72 (a state shown in FIG. 14).

Accordingly, the clutch member 72 is brought into a locked state where the rotation thereof has been regulated. As a result, even if an external force is applied to the rotary shaft 71*a* (gear 71) so as to rotate the shaft, the rotary shaft 71*a* (gear 71) does not rotate by meshing between the meshing teeth 72*a* and the meshing teeth 73*a*. In addition, at this time, the boss 75*a* formed in the torque transmission member 75 is located at an intersection place between the slopes 72*d* and 72*d*, as shown in FIG. 14.

When rotary torque is transmitted to the torque transmission member 75 (gear 75*b*) from the first planetary gear 95 or the second planetary gear 96 from this state, the boss 75*a* is pushed against on the slope 72*d* of the cam groove 72*b*, or pushes up the cam groove 72*b* (that is, clutch member 72) upward in FIG. 14 against the biasing force of the coil spring 74.

Figure 15B:
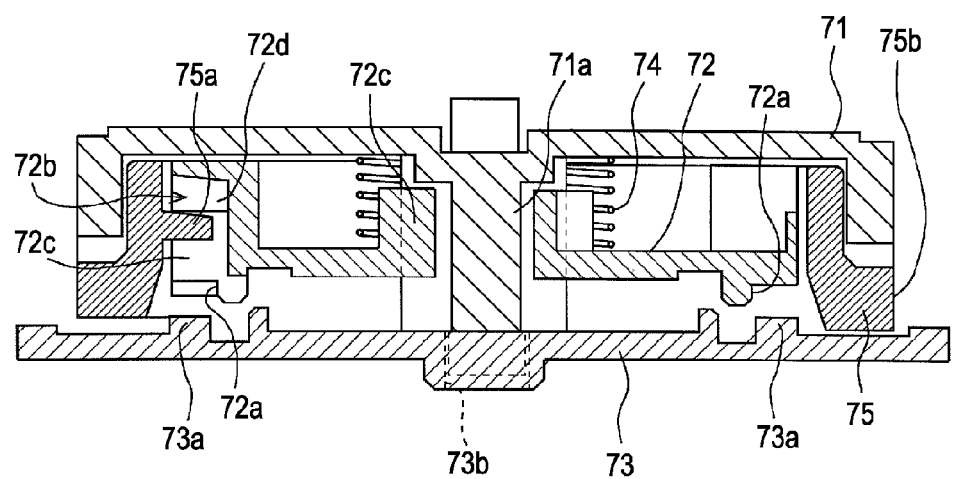

Thereby, as shown in FIG. 15B, the meshing between the meshing teeth 72*a* of the clutch member 72 and the meshing teeth 73*a* of the locking member 73 is released, that is, the clutch member 72 is brought into an unlocked state where the rotation thereof has been permitted. Subsequently, when the torque transmission member 75 rotates, the boss 75*a* moves from the position of contact of the cam groove 72*b* with the slope 72*d* to the position of contact of the cam groove with the side wall 72*c*. Thus, the torque transmission member 75, the clutch member 72, and the rotary shaft 71*a* (gear 71) are integrally rotated by pushing the side wall 72*c*.

Since the cam groove 72*b* is formed symmetrically, the operation of the locking device 70 described above is switched from the locked state of FIG. 15A to the unlocked state of FIG. 15B even if the gear 75*b* (torque transmission member 75) rotates in either direction, and is switched from the unlocked state of FIG. 15B to the locked state of FIG. 15A if the gear 75*b* is stopped.

As described above, with switching of the rotation/stop of the torque transmission member 75, the boss 75*a* is displaced within the cam groove 72*b*, whereby the locking device 70 switches the unlocked state where the rotation of the clutch member 72 (the rotary shaft 71*a* and the gear 71) is permitted, and the locked state where the rotation thereof is locked.

Subsequently, overall operation including the first planetary gear 95 and the second planetary gear 96 will be described. In FIG. 10, the first planetary lever 77 has a boss 77*a* on the side that faces the side frame 61, and the boss 77*a* is loosely inserted into a circular-arc guide groove 62 formed in the side frame 61, whereby the rockable range of the first planetary lever 77 is regulated by the guide groove 62.

Similarly, the second planetary lever 78 has a boss 78*a* on the side that faces the side frame 61, and the boss 78*a* is loosely inserted into a circular-arc guide groove 63 formed in the side frame 61, whereby the rockable range of the second planetary lever 78 is regulated by the guide groove 63.

Here, reference numeral γ1 represents the rockable angle of the first planetary lever 77, and similarly, reference numeral γ2 represents the rockable angle of the second planetary lever 78. As apparent from the drawing, in this embodiment, the rockable change is set to γ1<γ2. Thereby, the amount of displacement when the first planetary gear 95 is displaced between the meshing position and the separated position is made smaller than the amount of displacement when the second planetary gear 96 is displaced between the meshing position and the separated position.

FIG. 10 shows a normal rotation state of the transport driving roller 35 (gear 90). In this state, the first planetary gear 95 rotationally drives the gear 75b of the locking device 70 in the direction of an arrow in this drawing, and the gear 71 of the locking device 70 rotationally drives the gear 97, i.e., the driving roller 32 in the direction of an arrow in this drawing. That is, this state is a state where the recording sheet P can be transported from the upstream toward the downstream.

When the transport driving roller 35 (gear 90) is reversely driven in order to perform the aforementioned biting and ejecting type skew removal control, as shown in FIG. 11, the first planetary gear 95 is separated from the gear 75b, and the transmission gear 75 is brought into a power cutoff state where it meshes with neither the first planetary gear 95 nor the second planetary gear 96.

Accordingly, the locking device 70 is brought into a locked state which the rotary shaft 71a (gear 71) is locked so as not to rotate. At this time, although the rotation of the locking device 70 is locked by the driving roller 32, the downstream transport driving roller 35 is reversely driven continuously. Thus, the recording sheet P is bent between the driving roller 32 and the transport driving roller 35, and the leading edge of the sheet is ejected toward the upstream of the transport driving roller 35, thereby removing skew.

Also, if the second planetary gear 96 is displaced to the meshing position as shown in FIG. 12, and rotary torque is transmitted to the gear 75b, as described above, the locking device 70 unlocks the rotary shaft 71b (gear 71) and the rotary torque is transmitted to the rotary shaft 71b (gear 71), thereby reversely driving the driving roller 32.

As described above, the locking of the rotary shaft 71b (the gear 71, and the driving roller 32) by the locking device 70 is performed, using the power cutoff period during which both the first planetary gear 95 and the second planetary gear 96 do not mesh with the gear 75b.

In addition, when the transport driving roller 35 (gear 90) is again switched to the normal rotation driving from the state shown in FIG. 13, the amount of displacement that is generated until the first planetary gear 95 returns to the meshing position is set small. Thus, after switching from the reverse rotation driving of the transport driving roller 35 to the normal rotation driving thereof, the normal rotation driving of the driving roller 32 can be rapidly started without occurrence of large time lag.

Accordingly, since the time that is taken for the transport driving roller 35 to rotate normally in a state where the driving roller 32 has stopped can be shortened, the recording sheet P is stretched between the driving roller 32 and the transport driving roller 35, so that slip can be prevented from occurring between the driving roller 32 and the recording sheet P, thereby causing damage to a recording surface.

As described above, with switching of the rotation/stop of the torque transmission member 75, the boss 75a is displaced within the cam groove 72b, whereby the locking device 70 according to this embodiment switches the unlocked state where the rotation of the clutch member 72 (the rotary shaft 71a) is permitted, and the locked state where the rotation of the clutch member 72 (the rotary shaft 71a) is locked.

Accordingly, similarly to the locking device 50 according to the first embodiment that has been described earlier, when the transport driving roller 35 is switched to reverse rotation driving from normal rotation driving in order to perform the biting and ejecting type skew removal control, the rotation of the driving roller 32 is reliably locked. Thus, a sheet is reliably bent between the transport driving roller 35 and the driving roller 32, and consequently, skew is reliably eliminated.

Additionally, the duration of a locked state can be adjusted by adjusting the shape of the cam groove 72b. In addition, the duration of a locked state can be adjusted by adjusting the period (the amount of displacement of the first planetary gear 95 and the second planetary gear 96) where both the first planetary gear 95 and the second planetary gear 96 do not mesh with a spur gear 93. Thus, the period during which the driving roller 32 is locked can be more flexibly adjusted.

What is claimed is:

1. A locking device of a rotary shaft comprising:
   a clutch member rotating integrally with the rotary shaft and provided so as to be displaceable in a direction of axis of the rotary shaft;
   a locking member provided in a fixed state to engage the clutch member to regulate the rotation of the clutch member;
   a biasing member biasing the clutch member toward the locking member; and
   a torque transmission member rotating under a rotary torque transmitted thereto from a power source, having a boss loosely inserted into a cam groove provided in an outer peripheral portion of the clutch member, and transmitting the rotary torque to the clutch member via the boss,
   wherein the boss is displaced within the cam groove with switching of a rotation/stop of the torque transmission member or switching of the rotational direction thereof, to switch between an unlocked state where the boss separates the clutch member from the locking member against the biasing force of the biasing member, and a locked state where the boss permits displacement of the clutch member to engage the locking member with the clutch member,
   wherein an engaging portion between the locking member and the clutch member is constituted by meshing teeth,
   wherein the tooth profile of the meshing teeth is set such that a pressure angle $\delta 1$ with respect to one rotational direction of the clutch member is $0° < \delta 1 < 90°$, and a pressure angle $\delta 2$ with respect to the other rotational direction is $0°$.

2. The locking device of a rotary shaft according to claim 1, wherein the cam groove has regulation regions for restraining the clutch member in a position separated from the locking member, on both sides of a deregulation region for permitting displacement of the clutch member, and switching is made in order of the unlocked state, the locked state, and the unlocked state with switching of the rotational direction of the torque transmission member.

* * * * *